(12) United States Patent
Li (10) Patent No.: US 10,762,408 B2
(45) Date of Patent: Sep. 1, 2020

(54) SMART CARD (71) Applicant: TENDYRON CORPORATION, Beijing (CN)

(72) Inventor: Dongsheng Li, Beijing (CN)

(73) Assignee: TENDYRON CORPORATION, Beijing (CN)

( * ) Notice: Subject to any disclaimer, the term of this patent is extended or adjusted under 35 U.S.C. 154(b) by 0 days.

(21) Appl. No.: 16/489,340

(22) PCT Filed: Feb. 8, 2018

(86) PCT No.: PCT/CN2018/075713
§ 371 (c)(1),
(2) Date: Aug. 27, 2019

(87) PCT Pub. No.: WO2018/157716
PCT Pub. Date: Sep. 7, 2018

(65) Prior Publication Data
US 2020/0065639 A1 Feb. 27, 2020

(30) Foreign Application Priority Data

Mar. 1, 2017 (CN) .......................... 2017 1 0117395

(51) Int. Cl.
G06K 19/07 (2006.01)
G06F 9/30 (2018.01)
G06F 9/445 (2018.01)

(52) U.S. Cl.
CPC ......... *G06K 19/07* (2013.01); *G06F 9/30043* (2013.01); *G06F 9/44521* (2013.01)

(58) Field of Classification Search
CPC .. G06K 19/07; G06F 9/30043; G06F 9/44521
(Continued)

(56) References Cited

U.S. PATENT DOCUMENTS 7,506,175 B2   3/2009  Baentsch et al.
2005/0234825 A1* 10/2005 Andersson .............. G06F 21/51
                                                    705/51
(Continued)

FOREIGN PATENT DOCUMENTS

CN    101004798 A    7/2007
CN    103530171 A    1/2014
(Continued)

OTHER PUBLICATIONS

International Search Report dated May 10, 2018 for PCT/CN2018/075713.
(Continued)

*Primary Examiner* — Daniel A Hess
(74) *Attorney, Agent, or Firm* — Martin & Ferraro, LLP (57) ABSTRACT The virtual machine includes a receiving module, an instruction assigning module, a downloading module, an application registry maintenance module, a state switching module, a storage managing module, and a communication module. The state switching module is configured to in response to determining that it is required to move the code segment, allocate a storage space of the off-chip FLASH for the code segment of the application to be loaded, acquire a second base address of the code segment of the application to be loaded, and modify the current running address as the second base address. The off-chip FLASH is configured to store the code segment of the application to be loaded on the off-chip FLASH.

19 Claims, 1 Drawing Sheet (58) Field of Classification Search
USPC .................. 235/380, 492; 713/100; 705/51
See application file for complete search history.

(56) References Cited

U.S. PATENT DOCUMENTS

| | | | |
|---|---|---|---|
| 2006/0097040 A1* | 5/2006 | Castillo ................ | G07F 7/1008 235/380 |
| 2010/0012732 A1* | 1/2010 | Pinzinger ............... | G06F 21/34 235/492 |
| 2010/0205425 A1* | 8/2010 | Takacs .................. | G06F 21/32 713/100 |

FOREIGN PATENT DOCUMENTS

| | | |
|---|---|---|
| CN | 103559073 A | 2/2014 |
| CN | 106933536 A | 7/2017 |

OTHER PUBLICATIONS

Dec. 15, 2011, No. S2, ISSN: 1674-0246, pp. 20, 21, 23, 25, and 39. (Dang, Yanfeng. The Design and Implementation of Java Software Platform. Chinese Master's Full-text Theses Full-text Database, Information and Technology).

\* cited by examiner

SMART CARD

CROSS-REFERENCE TO RELATED APPLICATION

This application is a US national application of an International Application No. PCT/CN2018/075713, filed on Feb. 8, 2018, which is based on and claims priority to Chinese Patent Application Serial No. 201710117395.7, filed on Mar. 1, 2017, the entire contents of which are incorporated herein by reference.

TECHNICAL FIELD

The present disclosure relates to a field of electronic technologies, and more particularly, to a smart card.

BACKGROUND

Smart cards have become widely used as an important tool for personal identity verification and security authentication. In particular, the combination of Java technology and smart card technology extends the application field of the smart cards. The smart card may be often referred to as Java card due to its availability on Java virtual machines and various operating platforms.

The Java card is suitable for services such as over-the-air download, multimedia information management, and near distance payment, and supports the operation and management of many applications. As the Java card can support and process more and more services, more and more data may be stored in a cache of the card and processed by the card. The requirement on size of a memory card in the smart card also grows higher. However, at present, the size of a non-volatile memory of the smart card and the size of an on-chip FLASH of the memory card are relatively small, so that a capability of handling services by the smart card is limited.

SUMMARY

The present disclosure provides a smart card, at least including a virtual machine, an on-chip FLASH, and an off-chip FLASH. The virtual machine includes a receiving module, an instruction assigning module, a downloading module, an application registry maintenance module, a state switching module, a storage managing module, and a communication module. The receiving module is configured to receive a downloading instruction and transmit the downloading instruction to the instruction assigning module. The instruction assigning module is configured to receive the downloading instruction transmitted by the receiving module and trigger the downloading module to execute a corresponding operation. The downloading module is configured to acquire an intermediate code file of an application to be loaded. The intermediate code file includes a code segment of the application to be loaded and a first base address of the code segment of the application to be loaded. The first base address is a base address in the on-chip FLASH assigned by the virtual machine for the code segment of the application to be loaded. The application registry maintenance module is configured to generate an application registry key of the application to be loaded. The application registry key at least includes: identification information of the application to be loaded, a current running address and a current storage address of the code segment of the application to be loaded. The current running address is the first base address and the current storage address includes the first base address. The state switching module is configured to determine whether it is required to move the code segment of the application to be loaded stored in the on-chip FLASH according a the type of the application to be loaded, a requirement on running speed or a moving request input by the user; in response to determining that it is required to move the code segment the storage management module is configured to allocate a storage space of the off-chip FLASH for the code segment of the application to be loaded, acquire a second base address of the code segment of the application to be loaded, transmit to the communication module, a storage instruction for storing the code segment of the application to be loaded, and modify the current running address as the second base address, The second base address is the base address of the code segment of the application to be loaded in the off-chip FLASH. The storage management module is configured to allocate a storage space for the code segment of the application to be loaded in the off-chip FLASH, The communication module is configured to transmit the storage instruction to the off-chip FLASH. The off-chip FLASH is configured to, after receiving the storage instruction, store the code segment of the application to be loaded on the off-chip FLASH.

BRIEF DESCRIPTION OF THE DRAWINGS

Specific embodiments of the present disclosure will be described in detail below by way of representation and non-limitation by referring to drawings. The same reference numbers in the drawings refer to the same or similar elements throughout the drawings. Those skilled in the art should understand that the drawings are not necessarily drawn to scale. In the drawings.

DETAILED DESCRIPTION

Figure 1:
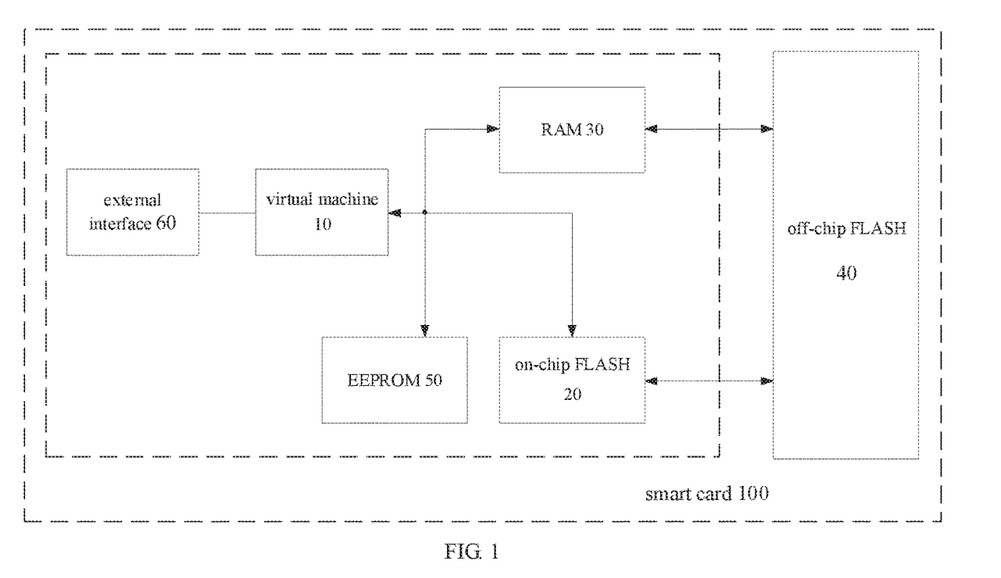
FIG. 1 is a schematic diagram illustrating a structure of a smart card according to Embodiment 1 of the present disclosure.

Embodiments of the present disclosure provide a smart card. FIG. 1 is a schematic diagram illustrating a structure of a smart card according to Embodiment 1 of the present disclosure. As shown in FIG. 1, the smart card 100 may include a virtual machine 10, an on-chip FLASH 20, a RAM 30, and an off-chip FLASH 40. The virtual machine 10 in embodiments is configured to manage system applications of the smart card and loading and running of many applications (APPs) of the smart card. For example, the virtual machine 10 may be a Java card virtual machine. The virtual machine 10 may be configured to convert a class file downloaded from an external device to the smart card to generate a bytecode file (such as .cap file). In addition, the virtual machine 10 may be configured to dynamically link the bytecode file to an application to generate an intermediate code file. Furthermore, the virtual machine 10 may be configured to store the intermediate code file of the application in a corresponding memory. Each of the on-chip FLASH 20, the RAM 30, and the off-chip FLASH 40 may be configured to store a code segment of the immediate code file (such as, a code segment of a system application and a code segment of the applications). A method indicated by the code segment may be performed by fetching an address of the code segment. Compared to related arts, the present disclosure may add an off-chip FLASH to an original memory (on-chip FLASH and nonvolatile memory) of the smart card, such that the code segment of the intermediate code file may be stored in the off-chip FLASH. In this way, a storage space of the smart card can be enlarged, and a capability of business handling of the smart card can be enhanced.

As a possible implementation of embodiments of the present disclosure, as illustrated in FIG. 1, the smart card may further include an electrically erasable programmable read-only memory (EEPROM) 50 for storing data of the application. The EEPROM is a nonvolatile memory that may delete data in bits. The smart card in embodiments may include many applications. In other words, the smart card in embodiments may load and manage many applications, including an application related to bank cards, an application related to bus cards, an application related to access control, and an application related to third-party memberships. The intermediate code file of an application may include a code segment and data. In embodiments, the data that is likely to be rewritten may be stored in the EEPROM 50, while the code segment that may not be rewritten may be stored in a cache (i.e., the on-chip FLASH 20, the RAM 30 or the off-chip FLASH 40). Therefore, the rewriting process may not be performed on the program stored in the cache (i.e., the on-chip FLASH 20, the RAM 30 or the off-chip FLASH 40), but may only be performed on the program stored in the EEPROM.

In embodiments, when the virtual machine loads the code segment of the application, the cache (i.e., the on-chip FLASH, the RAM or the off-chip FLASH) can be read and written. It can be understood that there may be a communication interface (not illustrated in drawings) provided between the virtual machine and each cache. The interaction information may be transmitted between the virtual machine and each cache through the communication interface. In addition, as illustrated in FIG. 1, the smart card may further include an external interface 60, configured to transmit the class file downloaded from the external device to the virtual machine 10. The external device may include, but be not limited to, a PC, a POS machines, a card reader, a mobile terminal, an IPAD, and a smart device (such as a smart wearable device). Any electronic device that can read and write the smart card may be included in a scope of protection of the present disclosure. The external interface 60 can be a wired interface or a wireless interface. The wired interface may be, for example, a serial port, a USB interface, or the like. The wireless interface may be, for example, a WIFI interface, a Bluetooth interface, an NFC interface, or the like.

In addition, as a possible implementation of embodiments of the present disclosure, the smart card may further include an encryption-decryption unit provided between the off-chip FLASH 40 and the original cache (i.e., the on-chip FLASH 20 and the RAM 30) of the smart card. The encryption-decryption unit may be configured to encrypt and decrypt data transmitted between the off-chip FLASH 40 and the original cache of the smart card to increase security of data transmission between the off-chip FLASH and the original cache of the smart card. For example, when the code segment of the intermediate code file of the system application stored in the on-chip FLASH 20 is moved to the off-chip FLASH 40, the encryption-decryption unit may be configured to encrypt the code segment and transmit the encrypted code segment to the off-chip FLASH 40. The off-chip FLASH 40 may be configured to decrypt the encrypted code segment to acquire and store the original code segment. As another example, when it is required to run on a chip the code segment of the intermediate code file of an application (such as the application related to bus cards) stored in the off-chip FLASH 40, the code segment may be required to be moved into the on-chip FLASH 20 such that addresses of the code segment may be fetched in the FLASH 20 to execute the method indicated by the code segment. When the code segment is moved, the off-chip FLASH 40 may be configured to encrypt the code segment and to transmit the encrypted code segment to the encryption-decryption unit. The encryption-decryption unit may be configured to decrypt the encrypted code segment and store the decrypted original code segment into the on-chip FLASH 20. A key of the encryption and the decryption may be preset or negotiated by the off-chip FLASH and the encryption-decryption unit and may be saved separately.

Below, descriptions will focus on details of a structure of the virtual machine 10 in the smart card 100 and functions of modules of the virtual machine 10. In addition, a process of installing, loading and running an application by the smart card added with the off-chip FLASH may be described, from a perspective of the virtual machine 10.

Figure 2:
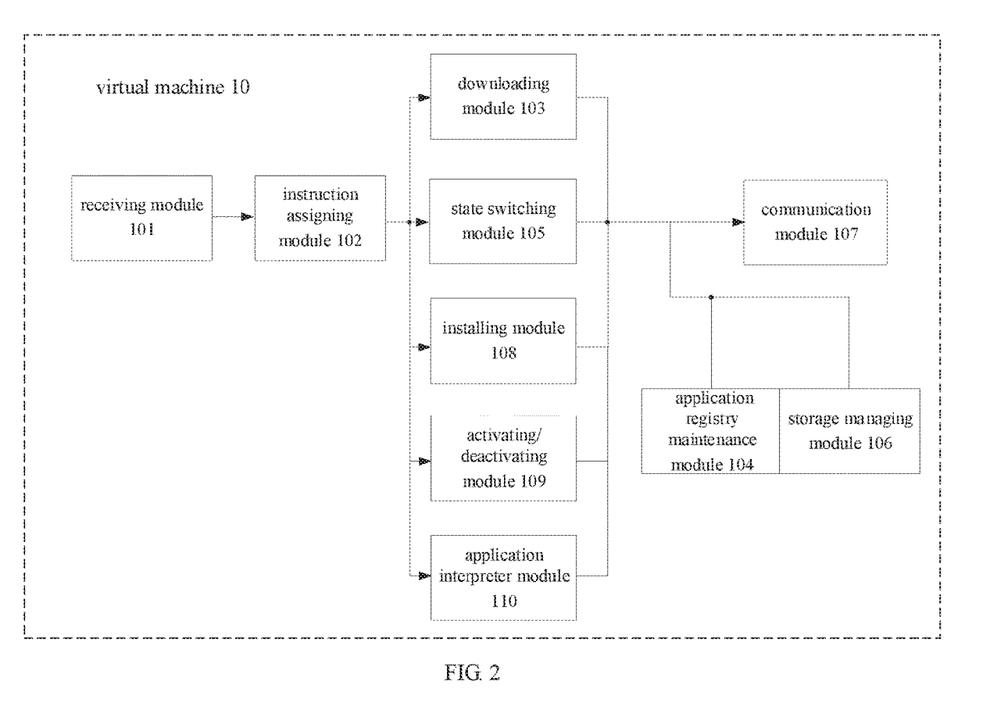
FIG. 2 is a schematic diagram illustrating a structure of a virtual machine according to Embodiment 1 of the present disclosure.

As illustrated in FIG. 2, embodiments of the present disclosure provide a virtual machine 10. The virtual machine 10 includes a receiving module 101, an instruction assigning module 102, a downloading module 103, an application registry maintenance module 104, a state switching module 105, a storage managing module 106, and a communication module 107. The receiving module 101 may be configured to receive a downloading instruction and transmit the downloading instruction to the instruction issuing module 102. The instruction assigning module 102 may be configured to receive the downloading instruction transmitted by the receiving module 101 and to trigger the downloading module 103 to execute a corresponding operation. The downloading module 103 may be configured to acquire an intermediate code file of an application to be loaded. The intermediate code file may include a code segment of the application to be loaded and a first base address of the code segment of the application to be loaded. The first base address may be a base address contained in the on-chip FLASH 20 and assigned by the virtual machine for the code segment of the application to be loaded. The application registry maintenance module 104 may be configured to generate an application registry key of the application to be loaded. The application registry key may at least include identification information of the application to be loaded, a current running address and a current storage address of the code segment of the application to be loaded. The current running address of the code segment of the application to be loaded may be the first base address. The current storage address of the code segment of the application to be loaded may include the first base address. The state switching module 105 may be configured to determine whether to move the code segment of the application to be loaded stored in the on-chip FLASH 20, according to a type of the application to be loaded, a requirement on a running speed or a moving request input by the user. When it is determined that it is necessary to move the code segment, the storage managing module 106 may be configured to allocate a storage space of the off-chip FLASH for the code segment of the application to be loaded to obtain a second base address of the code segment of the application to be loaded. In addition, the storage managing module 106 may be configured to transmit a storage instruction for storing the code segment of the application to be loaded to the communication module 107. Furthermore, the storage managing module 106 may be configured to modify the current running address of the code segment of the application to be loaded as the second base address. The second base address is a base address contained in the off-chip FLASH allocated for the code segment of the application to be loaded. The storage managing module 106 may be configured to allocate a storage space in the off-chip FLASH for the code segment of the application to be loaded. The communication module 107 may be configured to transmit the storage instruction to the off-chip FLASH. The off-chip FLASH 40 may be configured to store the code segment of the application to be loaded in the off-chip FLASH, after receiving the storage instruction.

In embodiments, the off-chip FLASH may be added to the smart card having the original cache and the virtual machine may move the code segment of the application to be loaded stored in the on-chip FLASH to the off-chip FLASH, such that the storage space of the smart card may be enlarged, thereby improving a capability of business handling of the smart card.

In embodiments, the receiving module 101 may be configured to receive an operation instruction, such as a downloading instruction, an installing instruction, a state switching instruction, a deletion instruction, an application activation/deactivation instruction, an application operation instruction (such as signature, data reading), to trigger a corresponding module to perform an operation indicated by the operation instruction. Except the application operation instruction, first several operation instructions may be referred to as system operation instructions. In addition to receiving the operation instruction, the receiving module 101 can receive a class file downloaded from the external device to the smart card via the external interface 60 of the smart card and transmit the class file to the downloading module 103. The download module 103 may be configured to acquire the intermediate code file of the application to be loaded. Details may include the following. The class file of the application to be loaded may be converted into the bytecode file (.cap file). The bytecode file may be dynamically linked to generate the intermediate code file. Since the virtual machines produced by different manufacturers are different, the intermediate code file adaptive to the virtual machine may be generated by converting the downloaded class file and dynamically linking the bytecode file, such that various virtual machines can be compatible.

In embodiments, both the intermediate code file of system application and the intermediate file of the application are composed of the code segment and the data. The code segment may indicate many methods, including an installing method, an activating method, a deactivating method, a deleting method, a signing method, and a data reading method. The receiving module 101 may be configured to receive a corresponding operation instruction and trigger a corresponding module to perform the method indicated by the operation instruction by fetching address. In embodiments, since the code segment may be stored in several caches (on-chip FLASH, RAM, and off-chip FLASH) of the smart card, when an existing method of an absolute address is used to fetch the address of the code segment, it may be required to allocate an absolute address to each method indicated by the code segment of the cache. Therefore, a workload of allocating the absolute address may be heavy and the number of absolute addresses may be large. In addition, a complexity of searching for an absolute address during address fetching may be high. Consequently, a speed of fetching the address of the method may be reduced. Therefore, in order to facilitate to fetch address of the method in the code segment, a manner of "base address+ relative address" to fetch the address of method in the code segment may be adopted in embodiments. The base address may refer to a starting position allocated for a code segment of the intermediate code file of an application when the code segment is stored in the cache. A code segment may have a unique base address in a cache and have a different base address in a different cache. For example, for the same code segment, the base address allocated in the on-chip FLASH may be a first base address (for example, 0x8000), the base address assigned in the off-chip FLASH may be a second base address (for example, 0x800000), and the base address allocated in the RAM may be a third base address (for example, 0x200000). In addition, the relative address may refer to an offset relative to the starting position of the method in the code segment. The offset may be an offset configured by the smart card system according to a size of the space occupied by each method in the code segment. For example, When the starting position is 0000 and the size of a first method is 1 k, the relative address of the first method may be 0x0400. When the second method is 2 k, the relative address of the second method may be 0x0c00. Therefore, in embodiments, the relative address of the method in the code segment may be preset by the system. The relative address may be an offset relative to the starting position, independent of the base address allocated in the cache. In other words, the offset of the method may not change in different caches. When fetching address of the method in the code segment to run the method, a starting position may be found for the code segment in which the method is contained. The starting position may be pointed by a pointer. The starting position corresponding to the method may be located by moving down an offset (relative address) from the starting position of the code segment. Program statements may be read from the starting position of the method. Fetching the address of the method in the code segment by means of "base address+ relative address" can greatly reduce workload of address allocation. In addition, the address fetching may be convenient and fast, thereby reducing a complexity of fetching address and improving a running speed of fetching address.

In embodiments, the application registry maintenance module 104 may be configured to maintain a registry. The registry may include a plurality of registry keys. Each registry key may correspond to an application and record related information of the application, such as, identification information AID, current running address, current storage address, and installation information. The AID identification information may be used to uniquely identify an application. The current running address and the current storage address may both refer to the base address. The code segment of the application may run and be stored on a cache to which the base address belongs. The current running address and the current storage address may be same to each other by default. That is, the code segment of the application may run in a cache, indicated by the current running address, that is indicated by the current storage address. Certainly, the code segment may also be stored in many caches. Therefore, the current storage address may contain base addresses of the code segment in many caches. In other words, there may be multiple current storage addresses. The current running address may indicate a cache in which the code segment actually runs. The code segment of the application may run in a single cache. Therefore, there is one current running address. In embodiments, the code segment of the application downloaded by the virtual machine from the external device may be stored on the on-chip FLASH. The first base address may be an address in the on-chip FLASH assigned for the code segment of the application to be loaded. In case of moving, the code segment of the application to be loaded may be stored on the off-chip FLASH. The second base address may be an address allocated for the code segment of the application to be loaded in the off-chip FLASH.

After the download module 103 converts the class file downloaded from the external device to the smart card to generate the bytecode file (.cap file) and dynamically linking the bytecode file to convert the bytecode file into the intermediate code file, the state switching module 105 may be configured to determine whether to move the code segment of the application to be loaded stored in the on-chip FLASH, according to a type of the application to be loaded, a requirement on running speed, or a moving request input by the user. It may be understood that the running speeds of the same code segment stored in the RAM, the on-chip FLASH and the off-chip FLASH gradually decrease. In addition, in order to enlarge capacity, after the code segment is moved to the off-chip FLASH, when it is required to run the code segment in the on-chip FLASH but no code segment exists on the on-chip FLASH, the code segment stored in the off-chip FLASH needs to be moved back to the on-chip FLASH, and the address may be fetched in the on-chip FLASH to run the code segment. In such a scenario, the running speed of the application may be further reduced. Therefore, on the basis of capacity expansion by moving the code segment stored in the on-chip FLASH to the off-chip FLASH, in order to further improve the running speed and a response speed of the smart card system, the code segment may be selectively moved in embodiments. That is, in a case where moving is required, the moving operation is performed. Therefore, the running speed and the response speed of the system may be improved wholly to provide good user experience while ensuring the capacity expansion of the smart card.

In embodiments, the type of the application to be loaded may be, for example, an application that is adapted to operate with a wired interface and an application that is adapted to operate with a wireless interface. It may be configured to move the application adapted to operate with the wireless interface while not to move the application adapted to operate with the wired interface. As another example, the application adapted to operate with the wireless interface may run in a state that NFC, Bluetooth, or WIFI is on. Since the NFC application requires a short processing time, it may be configured to not move the application running in the state that the NFC. Therefore, an application requiring a short processing time can be stored on the on-chip FLASH, thereby improving the running speed and the response speed of the entire smart card system and improving the user experience. In addition, in embodiments, the running speed requirement of the application to be loaded may be a priority of the application configured, so that the application with the high priority has a fast running speed and a short processing time. For example, it may be configured to not move a commonly-used application or an important application and to move a less-commonly-used application. In this way, the application commonly used may run on the chip frequently, such that the running speed and the response speed of the entire the smart card system may also be increased, thereby improving the user experience. In addition, in embodiments, after the intermediate code file of the application to be loaded is acquired by the downloading module 103, the state switching module 105 may be further configured to prompt the user with prompt information on whether to move the current application to be loaded. For example, the user may be prompted with audio broadcasting or display screen. After the moving request input by the user is received, the moving operation is implemented.

In embodiments, the storage managing module 106 may be configured to allocate, manage, and record a storage space of the code segment of each application. The communication module 107 may be a communication interface provided between the virtual machine and each cache and configured to output instructions issued by the virtual machine to each cache. After receiving a storage instruction output by the communication module 107, the off-chip FLASH 40 may read the code segment of the application to be loaded from the on-chip FLASH and write it to the on-chip FLASH 40. As a possible implementation of embodiments of the present disclosure, the code segment of the application to be loaded read from the on-chip FLASH may be output to the encryption-decryption unit of the smart card, such that the code segment may be outputted to the off-chip FLASH after being encrypted by the encryption-decryption unit. The off-chip FLASH may be configured to store the code segment decrypted from a storage position indicated by the second base address allocated by the storage managing module 106 after the code segment is decrypted. Therefore, it can be ensured that the code segment may not be illegally hijacked during a process of storing the code segment in the off-chip FLASH, thereby ensuring security of transmission between the on-chip FLASH and the off-chip FLASH.

As a possible implementation, the state switching module 105 may be further configured to transmit, to the communication module 107, a deletion instruction of deleting the code segment of the application to be loaded. The communication module 107 may be further configured to transmit the deletion instruction to the on-chip FLASH 20. The on-chip FLASH 20 may be configured to delete the code segment of the application to be loaded from the on-chip FLASH 20 after receiving the deletion instruction. In embodiments, "moving" may specifically refer to coping the code segment, such that moving by the virtual machine the code segment stored in the on-chip FLASH may refer to coping the code segment stored in the on-chip FLASH and saving the code segment on the off-chip FLASH. In embodiments, after the code segment is moved, the code segment stored in the on-chip FLASH may be deleted or may not be deleted. It should be noted that, in embodiments, the code segment of the intermediate code file of the application downloaded by the virtual machine from external devices may be moved after being stored in the on-chip FLASH. Therefore, after the code segment is copied and deleted from the on-chip FLASH, the storage space of the smart card may be released to provide more storage space for a subsequent code segment of intermediate code file of application downloaded from external device. However, if the code segment is not deleted from the on-chip FLASH, the storage space may not be released. In a case where it is required to fetch address of the code segment on the on-chip FLASH address, the address corresponding to the method in the code segment may be fetched directly, without coping the code segment in the off-chip FLASH, such that the running speed of application in the smart card may be improved. Therefore, configurations can be arranged according to requirements by designers, regardless of whether the code segment is deleted from the on-chip FLASH or not.

As a possible implementation, the virtual machine may further include an installing module 108. The receiving module 101 may be further configured to receive an installation instruction and transmit the installation instruction to the instruction assigning module 102. The instruction assigning module 102 may be further configured to receive the installation instruction transmitted by the receiving module 101 and trigger the installing module 108 to execute a corresponding operation. The installing module 108 may be configured to acquire a relative address of an installation method in the code segment of the application to be loaded, acquire an absolute address of the installation method through an calculation by adding the base address of the code segment to the relative address of the method, fetch an address of the installation method from the absolute address of the installation method, create an application instance of the application to be loaded in the on-chip FLASH, and add the application instance of the application to be loaded in the application registry key. When the code segment to be loaded is stored on the on-chip FLASH, the base address of the code segment may be the first base address. When the code segment of the application to be loaded is stored on the off-chip FLASH, the base address of the code segment may be the second base address. In embodiments, if the state switching module 105 does not move the code segment of the application to be loaded, the base address of the code segment of the application to be loaded is the first base address, i.e., the base address allocated in the on-chip FLASH. If the state switching module 105 moves the code segment of the application to be loaded to the off-chip FLASH, the base address of the code segment of the application to be loaded is the second base address, i.e., the base address allocated in the off-chip FLASH. The application to be loaded can be installed on the smart card by fetching the address of a security method through the installing module 107.

In embodiments, the smart card may include many applications. In a specific implementation, downloading, installing, and moving the applications may be performed in the manner described above.

In a specific implementation, as a possible implementation, an actual running medium of each application may be switched among each other. For example, the current storage address and the current running address recorded in the application registry key of an application may be both the second base address of the off-chip FLASH. In order to improve the running speed, the code segment of the intermediate code file of the application stored on the off-chip FLASH may run on the on-chip FLASH or RAM. Specifically, in embodiments, the receiving module 101 may be further configured to receive a state switching instruction and transmit the state switching instruction to the instruction assigning module 102. The state switching instruction may at least include identification information of the application whose state is to be switched and a running medium of the application to be switched. The running medium includes one of RAM, on-chip FLASH, and off-chip FLASH. The instruction assigning module 102 may be configured to receive the state switching instruction transmitted by the receiving module 101 and trigger the state switching module 105 to execute a corresponding operation. According to the state switching instruction, the virtual machine can switch the application to be switched to the running medium for address fetching operation. The state switching module 105 may be further configured to acquire the application registry key of the application to be switched, according to the identification information of the application to be switched. In a case where the application registry key of the application to be switched, it may be determined whether the current running address in the application registry key of the application to be switched belongs to an address segment of the running medium contained in the state switching instruction. In this way, it may be determined whether to switch the running medium of the application to be switched. In response to determining that the current running address belongs to the address segment, it may be indicated that the running medium contained in the state switching instruction is the current running medium for the application to be switched and there is no need to switch the running medium. In response to determining that the current running address does not belong to the address segment, it may be indicated that the current running medium of the application to be switched needs to be switched to the running medium contained in the state switching instruction. When it is required to switch the current running medium to the running medium contained in the state switching instruction, it is further determined whether the code segment of the intermediate code file of the application to be switched is already stored in the running medium contained in the state switching instruction. Therefore, in a specific implementation, if the determination result is that the current running does not belong to address segment of the running medium contained in the state switching instruction, it may be determined whether at least one current storage addresses in the application registry key of the application to be switched belongs to the address segment of the running medium contained in the state switching instruction. With the determination, it may be determined whether the code segment of the intermediate code file of the application to be switched is already allocated with a storage space in the running medium contained in the state switching instruction. In response to determining that at least one address belongs to the address segment of the running medium contained in the state switching instruction, it may be indicated that the virtual machine already allocates the storage space for the application to be switched in the running medium and there is no need to allocate the address. In response to determining that none of the addresses belongs to the address segment of the running medium contained in the state switching instruction, it may be indicated that the virtual machine does not allocate the storage space for the application to be stitched in the running medium. Therefore, if the determination result is negative, the code segment of the intermediate code file of the application to be switched may be allocated with the storage space in the running medium, such that a third base address of the code segment of the application to be switched may be acquired. A storage instruction of the code segment of the application to be switched may be transmitted to the communication module 107. The current running address of the application to be switched in the application registry key may be modified to the third base address and the third base address may be added as the current storage address of the application to be switched in the application registry key. The third base address may be a base address of the code segment of the application to be switched in the running medium. The communication module 107 may be further configured to transmit the storage instruction of the code segment of the application to be switched to the running medium. When the running medium is the RAM 30, the RAM 30 may be configured to store the code segment of the application to be switched to the storage space of the RAM 30 pointed by the third base address after receiving the storage instruction of the code segment of the application to be switched. When the running medium is the on-chip FLASH 20, the on-chip FLASH 20 may be configured to store the code segment of the application to be switched to the storage space of the on-chip FLASH 20 pointed by the third base address after receiving the storage instruction of the code segment of the application to be switched. When the running medium is the off-chip FLASH 40, the off-chip FLASH 40 may be configured to store the code segment of the application to be switched to the storage space of the off-chip FLASH 40 pointed by the third base address after receiving the storage instruction of the code segment of the application to be switched. Thus, when the off-chip FLASH is added to the smart card as the running medium for enlarging capacity, the running medium of the application to be switched, can be switched among each other according to the state switching instruction. Especially when off-chip FLASH storing and enabling to run the code segment is switched to the on-chip FLASH or RAM, the running speed of the application can be improved.

As a possible implementation, the virtual machine may further include an activating/deactivating module 109 for performing an activation or deactivation operation. In detail, in embodiments, the receiving module 101 may be further configured to receive an application activating instruction and transmit the application activating instruction to the instruction assigning module 102. The application activating instruction may at least include identification information of the application to be activated and a running medium of the application to be activated. The running medium may include one of the RAM, the on-chip FLASH and the off-chip FLASH. The instruction assigning module 102 may be configured to receive the application activating instruction transmitted by the receiving module 101 and trigger the activating/deactivating module to execute a corresponding operation. According to the application activating instruction, the virtual machine can activate an installed application such that the activated application may be used by the user. The activating/deactivating module 109 may be further configured to acquire the application registry key of the application to be activated based on the identification information of the application to be activated. In a case of acquiring the application registry key of the application to be activated, the state of the application to be activated may be set to an active state with a system global variable. It may be determined whether the current running address in the application registry key of the application to be activated belongs to the address segment of the running medium contained the application activating instruction. In response to determining that the current running address belongs to the address segment, an activating process may be executed. That is, a deactivation method may be invoked to deactivate the application in the active state, and an activation method may be invoked to activate the application to be activated. In detail, the relative address of the deactivation method in the code segment of the application to be activated may be acquired. The absolute address of the deactivation method may be calculated by adding the current running address in the application registry key of the application to be activated to the relative address of the deactivation method. The address of the deactivation method may be fetched from the absolute address of the deactivation method, such that the application in the active state may be deactivated. In addition, the relative address of the activation method in the code segment of the application to be activated may be acquired. The absolute address of the activation method may be calculated by adding the current running address in the application registry key of the application to be activated to the relative address of the activation method. The address of the activation method may be fetched from the absolute address of the activation method, such that the application to be activated may be activated. If the current running address does not belong to the address segment, it may be determined whether at least one current storage address in the application registry key of the application to be activated belongs to the address segment of the running medium. Based on the determination, it may be further determined whether the application to be activated is stored in the running medium contained in the application activating instruction. If the application to be activated is stored in the running medium, there is no need to allocate the space. If the application to be activated is stored in the running medium, the storage space is required to be allocated to the code segment of the intermediate code file for the application to be activated in the running medium contained in the application activation instruction. Accordingly, in detail, if at least one address belongs to the address segment of the running medium contained in the application activating instruction, the base address of the code segment of the application to be activated in the running medium may be acquired. The current running address in the application registry key of the application to be activated may be modified as the base address of the code segment of the application to be activated in the running medium. The address of the code segment of the application to be activated may be fetched from the base address of the running medium, and the activating process may be implemented, which may be seen from the above described in detail. If no address belongs to the address segment of the running medium contained in the state switching instruction, it may be required to allocate the storage space for the code segment of the application to be activated in the running medium and a fourth base address of the code segment of the application to be activated may be acquired. The storage instruction of storing the code segment of the application to be activated may be transmitted to the communication module. The current running address in the application registry key of the application to be activated may be modified as the fourth base address and the address of the code segment of the application to be activated may be fetched from the fourth base address to implement the activation process, which may be seen from above described in detail. The fourth base address may be the base address of the code segment of the application to be activated on the running medium. The communication module 107 may be further configured to transmit, to the running medium, the storage instruction for storing the code segment of the application to be activated. When the running medium is the RAM 30, the RAM 30 may be configured to store the code segment of the application to be activated to the storage space of the RAM 30 pointed by the fourth base address after receiving the storage instruction of the code segment of the application to be activated. When the running medium is the on-chip FLASH 20, the on-chip FLASH 20 may be configured to store the code segment of the application to be activated to the storage space of the on-chip FLASH 20 pointed by the fourth base address after receiving the storage instruction of the code segment of the application to be activated. When the running medium is the off-chip FLASH 40, the off-chip FLASH 40 may be configured to store the code segment of the application to be activated to the storage space of the off-chip FLASH 40 pointed by the fourth base address after receiving the storage instruction of the code segment of the application to be activated. Thus, in a case where the off-chip FLASH is added to the smart card as the running medium for enlarging capacity, an activating operation on the installed application may be realized by the virtual machine through the application activating instruction.

As a possible implementation, the receiving module 101 may be further configured to receive an application deactivating instruction and transmit the deactivating instruction to the instruction assigning module 102. The application deactivating instruction may at least include identification information of the application to be deactivated. The instruction assigning module 102 may be configured to receive the application deactivating instruction transmitted by the receiving module 101 and trigger the activating/deactivating module to execute a corresponding operation. The activating/deactivating module 109 may be further configured to acquire the application registry key of the application to be deactivated based on the identification information of the application to be deactivated. In a case where the application registry key of the application to be deactivated is acquired, it may be determined whether it is required to delete the intermediate code file of the application to be deactivated according to a type of the application to be deactivated, a requirement of running speed requirement or an application deletion request input by the user. In response to determining that it is required to delete the intermediate code file, a data deletion instruction for deleting data of the intermediate code file of the application to be deactivated and deleting the application registry key of the application to be deactivated may be transmitted to the communication module and a code deletion instruction for deleting the code segment of the application to be deactivated may be transmitted to the communication module. In response to determining that it not necessary to delete the intermediate code file, the state of the application to be deactivated may be set to an inactive state with the global variable. The communication module 107 may be configured to transmit the data deletion instruction to the on-chip FLASH 20 and to transmit the code deletion instruction to the running medium corresponding to the address segment of the current running address in the application registry key of the application to be deactivated. The on-chip FLASH 20 may be configured to, after receiving the data deletion instruction transmitted by the communication module, delete the data of the application to be deactivated and the application registry key of the application to be deactivated. When the running medium is the RAM 30, the RAM 30 may be configured to, after receiving the code deletion instruction transmitted by the communication module, delete the code segment of the application to be deactivated from the RAM. When the running medium is the on-chip FLASH, the on-chip FLASH 20 may be further configured to after receiving the code deletion instruction transmitted by the communication module, delete the code segment of the application to be deactivated from the on-chip FLASH 20. When the running medium is the off-chip FLASH, the off-chip FLASH 40 may be further configured to after receiving the code deletion instruction transmitted by the communication module, delete the code segment of the application to be deactivated from the off-chip FLASH 40.

In embodiments, after the deactivating instruction is received, the activating/deactivating module 109 may be configured to delete or not delete the intermediate code file of the application to be deactivated. Similar to the determination on whether to move by the state switching module 105 the code segment, in order to ensure the capacity expansion of the smart card while improving the running speed and the response speed of the entire system and providing good use experience, in embodiments, as a possible implementation, the activating/deactivating module 109 may be configured to determine whether to delete the intermediate code file of the application to be deactivated, according to a type of the application to be deactivated, a requirement on running speed or a deactivation request input by the user. In detail, for example, it may be configured to not delete the intermediate code file occupying a small storage space, spending a short processing time, frequently used or of an important application when being deactivated, so that the running speed and the response speed of the entire smart card system can be improved and user experience of the user may be improved. In addition, in embodiments, after the deactivating instruction is received, the activating/deactivating module 109 may be further configured to prompt the user with prompt information on whether to delete the application to be deactivated, for example by audio broadcasting or display screen. After the application deletion request input by the user is received, the deletion operation may be implemented.

As a possible implementation, the virtual machine may further include an application interpreter module 110. The receiving module 101 may be configured to receive an application operation instruction and transmit the application operation instruction to the instruction assigning module 102. The instruction assigning module 102 may be configured to receive the application operation instruction transmitted by the receiving module 101 and trigger the application interpreter module 110 to execute a corresponding operation. The application operation instruction may refer to an instruction corresponding to a specific operation of each application and not of a system application, for example, a digital signature instruction, a private key invoking instruction, a data writing instruction, and the like. After the application is activated, the virtual machine can perform the specific application operation of the application in an active state according to the application operation instruction. The application interpreter module 110 may be further configured to acquire the application registry key of the application in the active state, acquire a relative address of a method corresponding to the application operation instruction in the code segment of the application in the active state, acquire a fifth base address of the code segment of the application in the active state from the application registry key of the application in an active state, acquire an absolute address of the method corresponding to the application operation instruction through calculation by adding the fifth base address to the relative address of the method corresponding to the application operation instruction, fetch an address of the method corresponding to the application operation instruction from the absolute address of the method corresponding to the application operation instruction, and perform the operation corresponding to the application operation instruction. The fifth base address is the current running address of the code segment of the application in the active state.

With the smart card in embodiments, the off-chip FLASH may be added to the original memory (including the on-chip FLASH and the RAM), such that the code segment of the intermediate code file may be stored on the off-chip FLASH. In this way, the original storage space of the smart card can be enlarged. In addition, on the basis of the capacity expansion, the virtual machine in embodiments may be capable of downloading, installing, activating/deactivating applications and invoking specific application operations after the application is activated, while being compatible with existing running modes of the virtual machine.

It should be understood that each part of the present disclosure may be realized by the hardware, software, firmware or their combination. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, optical disks, etc.

What is claimed is:

1. A smart card, at least comprising: a virtual machine and an on-chip FLASH, and further comprising an off-chip FLASH; wherein the virtual machine comprises: a receiving module, an instruction assigning module, a downloading module, an application registry maintenance module, a state switching module; a storage managing module, and a communication module;

the receiving module is configured to receive a downloading instruction and transmit the downloading instruction to the instruction issuing module;

the instruction assigning module is configured to receive the downloading instruction transmitted by the receiving module and trigger the downloading module to execute a corresponding operation;

the downloading module is configured to acquire an intermediate code file of an application to be loaded; the intermediate code file at least comprising: a code segment of the application to be loaded and a first base address of the code segment of the application to be loaded; and the first base address being an address in the on-chip FLASH assigned by the virtual machine for the code segment of the application to be loaded;

the application registry maintenance module is configured to generate an application registry key of the application to be loaded; the application registry key comprising at least: identification information of the application to be loaded, a current running address and a current storage address of the code segment of the application to be loaded; and the current running address being the first base address and the current storage address comprising the first base address;

the state switching module is configured to determine whether it is required to move the code segment of the application to be loaded stored in the on-chip FLASH, according to a type of the application to be loaded, a requirement on running speed or a moving request input by the user; in response to determining that it is required to move the code segment, allocate by the storage managing module, a storage space of the off-chip FLASH for the code segment of the application to be loaded, acquire a second base address of the code segment of the application to be loaded, transmit to the communication module, a storage instruction for storing the code segment of the application to be loaded, and modify the current running address as the second base address, wherein the second base address is the base address of the code segment of the application to be loaded in the off-chip FLASH;

the storage managing module is configured to allocate a storage space of the off-chip FLASH for the code segment of the application to be loaded; and the communication module is configured to transmit the storage instruction to the off-chip FLASH;

wherein the off-chip FLASH is configured to, after receiving the storage instruction, store the code segment of the application to be loaded on the off-chip FLASH.

2. The smart card according to claim 1, wherein the virtual machine further comprises an installing module, wherein the receiving module is further configured to receive an installing instruction and transmit the installing instruction to the instruction assigning module;

the instruction assigning module is further configured to receive the installing instruction transmitted by the receiving module and trigger the installing module to execute a corresponding operation;

the installing module is configured to acquire a relative address of an installation method in the code segment of the application to be loaded, acquire an absolute address of the installation method by adding the base address of the code segment to the relative address of the installation method, fetch an address of the installation method from the absolute address of the installation method, create an application instance of the application to be loaded in the on-chip FLASH, and add the application instance of the application to be loaded into the application registry key;

wherein in response to determining that the code segment is stored on the on-chip FLASH, the base address of the code segment is the first base address; and in response to determining that the code segment is stored in the off-chip FLASH, the base address of the code segment is the second base address.

3. The smart card according to claim 1, wherein, the state switching module is further configured to transmit to the communication module, a deletion instruction for deleting the code segment of an application to be loaded;

the communication module is further configured to transmit the deletion instruction to the on-chip FLASH; and the on-chip FLASH is configured to delete the code segment of the application to be loaded from the on-chip FLASH after receiving the deletion instruction.

4. The smart card according to claim 1, further comprising a random-access memory (RAM), wherein, the receiving module is further configured to receive a state switching instruction and transmit the state switching instruction to the instruction assigning module, the state switching instruction at least comprising: identification information of an application to be switched and a running medium for running the application to be switched, the running medium comprising one of the RAM, the on-chip FLASH, and the off-chip FLASH;

the instruction assigning module is configured to receive the state switching instruction transmitted by the receiving module and trigger the state switching module to execute a corresponding operation;

the state switching module is further configured to acquire an application registry key of the application to be switched according to the identification information of the application to be switched; in a case of acquiring the application registry key of the application to be switched, determine whether a current running address contained in the application registry key of the application to be switched belongs to a address segment of the running medium; in response to determining that the current running address does not belong to the address segment, determine whether at least one current storage address in the application registry key of the application to be switched belongs to the address segment of the running medium; in response to determining that no current storage address belongs to the address segment, allocate a storage space of the running medium for the code segment of the intermediate code file of the application to be switched, acquire a third base address of the code segment of the application to be switched, transmit to the communication module, a storage instruction for storing the code segment of the application to be switched, modify the current running address of the application to be switched in the application registry key as the third base address, and add the third base address to the current storage address of the application to be switched in the application registry key, wherein the third base address is the base address of the code segment of the application to be switched in the running medium;

the communication module is further configured to transmit to the running medium, the storage instruction for storing the code segment of the application to be switched;

in response to determining that the running medium is the RAM, the RAM is configured to store the code segment of the application to be switched to a storage space of the RAM pointed by the third base address after receiving the storage instruction of the code segment of the application to be switched;

in response to determining that the running medium is the on-chip FLASH, the on-chip FLASH is configured to store the code segment of the application to be switched to a storage space of the on-chip FLASH pointed by the third base address after receiving the storage instruction of the code segment of the application to be switched; and in response to determining that the running medium is the off-chip FLASH, the off-chip FLASH is configured to store the code segment of the application to be switched to the storage space of the off-chip FLASH pointed by the third base address after receiving the storage instruction of the code segment of the application to be switched.

5. The smart card according to claim 1, further comprising a random-access memory (RAM) and the virtual machine further comprising an activating/deactivating module, wherein, the receiving module is further configured to receive an application activating instruction and transmit the application activating instruction to the instruction assigning module, the application activating instruction at least comprising: identification information of an application to be activated and a running medium for running the application to be activated, the running medium comprising one of the RAM, the on-chip FLASH and the off-chip FLASH;

the instruction assigning module is configured to receive the application activating instruction transmitted by the receiving module and trigger the activating/deactivating module to execute a corresponding operation;

the activating/deactivating module is further configured to acquire an application registry key of the application to be activated based on the identification information of the application to be activated; in a case of acquiring the application registry key of the application to be activated, set a state of the application to be activated to an active state with a system global variable; determine whether a current running address in the application registry key of the application to be activated belongs to a address segment of the running medium; in response to determining that the current running address belongs to the address segment, acquire a relative address of a deactivation method in the code segment of the application to be activated, obtain an absolute address of the deactivation method by adding the current running address in the application registry key of the application to be activated to the relative address of the deactivation method, fetch an address of the deactivation method from the absolute address of the deactivation method to deactivate the application in the active state, acquire a relative address of an activation method in the code segment of the application to be activated, acquire an absolute address of the activation method by adding the current running address in the application registry key of the application to be activated to the relative address of the activation method, fetch an address of the activation method from the absolute address of the activation method to activate the application to be activated; in response to determining that the current running address does not belong to the address segment, determine whether at least one current storage address in the application registry key of the application to be activated belongs to the address segment of the running medium; in response to determining that at least one current storage address belongs to the address segment, acquire a base address of the code segment of the application to be activated in the running medium, modify the current running address in the application registry key of the application to be activated as the base address of the code segment of the application to be activated in the running medium, fetch an address from the base address of the running medium of the code segment of the application to be activated to execute an activating process; in response to determining that no current storage address belongs to the address segment, allocating a storage space of the running medium for the code segment of the application to be activated, acquire a fourth base address of the code segment of the application to be activated, transmit, to the communication module, a storage instruction for storing the code segment of the application to be activated, modify the current running address in the application registry key of the application to be activated to the fourth base address, fetch an address from the fourth base address on the running medium of the code segment of the application to be activated to execute the activating process; wherein the fourth base address is a base address of the code segment of the application to be activated on the running medium; the activating process comprises: acquiring a relative address of a deactivation method in the code segment of the application to be activated, acquiring an absolute address of the deactivation method by adding the current running address in the application registry key of the application to be activated to the relative address of the deactivation method, fetching an address of the deactivation method from the absolute address of the deactivation method to deactivate an application in the active state, acquiring a relative address of the activation method in the code segment of the application to be activated, acquiring an absolute address of the activation method by adding the current running address in the application registry key of the application to be activated to the relative address of the activation method, fetching an address of the activation method from the absolute address of the activation method to activate the application to be activated;

the communication module is further configured to transmit, to the running medium, a storage instruction for storing the code segment of the application to be activated;

in response to determining that the running medium is the RAM, the RAM is configured to store the code segment of the application to be activated to a storage space of the RAM pointed by the fourth base address after receiving the storage instruction of the code segment of the application to be activated;

in response to determining that the running medium is the on-chip FLASH, the on-chip FLASH is configured to store the code segment of the application to be activated to a storage space of the on-chip FLASH pointed by the fourth base address after receiving the storage instruction of the code segment of the application to be activated; and in response to determining that the running medium is the off-chip FLASH, the off-chip FLASH is configured to store the code segment of the application to be activated to a storage space of the off-chip FLASH pointed by the fourth base address after receiving the storage instruction of the code segment of the application to be activated.

6. The smart card according to claim 5, wherein
the receiving module is further configured to receive an application deactivating instruction and transmit the application deactivating instruction to the instruction assigning module, the application deactivating instruction at least comprising identification information of an application to be deactivated;

the instruction assigning module is configured to receive the application deactivating instruction transmitted by the receiving module and trigger the activating/deactivating module to execute a corresponding operation;

the activating/deactivating module is further configured to acquire an application registry key of the application to be deactivated based on the identification information of the application to be deactivated, and in the case of acquiring the application registry key of the application to be deactivated, determine whether it is required to delete the intermediate code file of the application to be deactivated according to a type of the application to be deactivated, a requirement on running speed requirement or an application deletion request input by the user; in response to determining that it is required to delete the intermediate code file, transmit to the communication module; a data deletion instruction for deleting data of the intermediate code file of the application to be deactivated and deleting the application registry key of the application to be deactivated and transmit to the communication module, a code deletion instruction for deleting the code segment of the application to be deactivated; in response to determining that it is not required to delete the intermediate code file, setting a state of the application to be deactivated to an inactive state with a global variant;

the communication module is configured to transmit the data deletion instruction to the on-chip FLASH, and transmit the code deletion instruction to a running medium corresponding to an address segment of the current running address in the application registry key of the application to be deactivated;

the on-chip FLASH is configured to, after receiving the data deletion instruction transmitted by the communication module; delete the data of the application to be deactivated and the application registry key of the application to be deactivated;

in response to determining that the running medium is the RAM, the RAM is configured to, after receiving the code deletion instruction transmitted by the communication module, delete the code segment of the application to be deactivated from the RAM;

in response to determining that the running medium is the on-chip FLASH; the on-chip FLASH is further configured to after receiving the code deletion instruction transmitted by the communication module, delete the code segment of the application to be deactivated from the on-chip FLASH; and in response to determining that the running medium is the off-chip FLASH; the off-chip FLASH is further configured to after receiving the code deletion instruction transmitted by the communication module, delete the code segment of the application to be deactivated from the off-chip FLASH.

7. The smart card according to claim 5; wherein the virtual machine further comprises an application interpreter module;
the receiving module is configured to receive an application operation instruction and transmit the application operation instruction to the instruction assigning module;

the instruction assigning module is configured to receive the application operation instruction transmitted by the receiving module and trigger the application interpreter module to execute a corresponding operation; and the application interpreter module is further configured to acquire an application registry key of the application in an active state, acquire a relative address of a method corresponding to the application operation instruction in the code segment of the application in the active state, and acquire a fifth base address of the code segment of the application in the active state from the application registry key of the application in an active state, acquire an absolute address of the method corresponding to the application operation instruction by adding the fifth base address to the relative address of the method corresponding to the application operation instruction, fetch an address of the method corresponding to the application operation instruction from the absolute address of the method corresponding to the application operation instruction, and perform the operation corresponding to the application operation instruction, wherein the fifth base address is a current running address of the code segment of the application in the active state.

8. The smart card according to claim 1, further comprising an external interface, configured to transmit a class file downloaded from an external device to the virtual machine.

9. The smart card according to claim 1, further comprising an encryption-decryption unit, provided between the off-chip FLASH and the on-chip FLASH, configured to encrypt and decrypt data transmitted between the off-chip FLASH and the on-chip FLASH.

10. A method for loading an application in a smart card, the smart card comprising a virtual machine, an on-chip FLASH and an off-chip FLASH, the method comprising:

receiving a downloading instruction of an application to be loaded;

acquiring an intermediate code file of the application to be loaded; the intermediate code file at least comprising: a code segment of the application to be loaded and a first base address of the code segment of the application to be loaded, and the first base address being an address in the on-chip FLASH assigned by the virtual machine for the code segment of the application to be loaded;

generating an application registry key of the application to be loaded; the application registry key comprising at least: identification information of the application to be loaded, a current running address and a current storage address of the code segment of the application to be loaded; and the current running address being the first base address and the current storage address comprising the first base address;

determining whether it is required to move the code segment of the application to be loaded stored in the on-chip FLASH, according to a type of the application to be loaded, a requirement on running speed or a moving request input by the user;

in response to determining that it is required to move the code segment, allocating a storage space of the off-chip FLASH for the code segment of the application to be loaded, acquiring a second base address of the code segment of the application to be loaded, and modifying the current running address as the second base address, wherein the second base address is the base address of the code segment of the application to be loaded in the off-chip FLASH;

storing the code segment of the application to be loaded on the off-chip FLASH.

11. The method according to claim 10, further comprising:

receiving an installing instruction of an application to be loaded;

acquire a relative address of an installation method in the code segment of the application to be loaded, acquiring an absolute address of the installation method by adding the base address of the code segment to the relative address of the installation method, fetching an address of the installation method from the absolute address of the installation method, creating an application instance of the application to be loaded in the on-chip FLASH, and adding the application instance of the application to be loaded into the application registry key;

in response to determining that the code segment is stored on the on-chip FLASH, determining that the base address of the code segment is the first base address;

in response to determining that the code segment is stored in the off-chip FLASH, determining that the base address of the code segment is the second base address.

12. The method according to claim 10, further comprising:

deleting the code segment of the application to be loaded from the on-chip FLASH after and deleting the first base address from the current storage address.

13. The method of claim 10, further comprising:

receiving a state switching instruction of an application to be switched, the state switching instruction at least comprising: identification information of the application to be switched and a running medium for running the application to be switched, the running medium comprising one of the RAM, the on-chip FLASH, and the off-chip FLASH;

acquiring an application registry key of the application to be switched according to the identification information of the application to be switched;

in a case of acquiring the application registry key of the application to be switched, determining whether a current running address contained in the application registry key of the application to be switched belongs to a address segment of the running medium;

in response to determining that the current running address does not belong to the address segment, determining whether at least one current storage address in the application registry key of the application to be switched belongs to the address segment of the running medium;

in response to determining that no current storage address belongs to the address segment, allocating a storage space of the running medium for the code segment of the intermediate code file of the application to be switched, acquiring a third base address of the code segment of the application to be switched, modifying the current running address of the application to be switched in the application registry key as the third base address, and adding the third base address to the current storage address of the application to be switched in the application registry key, wherein the third base address is the base address of the code segment of the application to be switched in the running medium;

storing the code segment of the application to be switched to a storage space of the RAM, the on-chip FLASH or the off-chip FLASH pointed by the third base address.

14. The method of claim 10, further comprising:

receiving an application activating instruction of an application to be activated, the application activating instruction at least comprising: identification information of the application to be activated and a running medium for running the application to be activated, the running medium comprising one of the RAM, the on-chip FLASH and the off-chip FLASH;

acquiring an application registry key of the application to be activated based on the identification information of the application to be activated;

in a case of acquiring the application registry key of the application to be activated, setting a state of the application to be activated to an active state with a system global variable and determining whether a current running address in the application registry key of the application to be activated belongs to a address segment of the running medium;

in response to determining that the current running address belongs to the address segment, acquiring a relative address of a deactivation method in the code segment of the application to be activated, obtaining an absolute address of the deactivation method by adding the current running address in the application registry key of the application to be activated to the relative address of the deactivation method, and fetching an address of the deactivation method from the absolute address of the deactivation method to deactivate the application in the active state; acquiring a relative address of an activation method in the code segment of the application to be activated, acquiring an absolute address of the activation method by adding the current running address in the application registry key of the application to be activated to the relative address of the activation method, and fetching an address of the activation method from the absolute address of the activation method to activate the application to be activated;

in response to determining that the current running address does not belong to the address segment, determining whether at least one current storage address in the application registry key of the application to be activated belongs to the address segment of the running medium;

in response to determining that at least one current storage address belongs to the address segment, acquiring a base address of the code segment of the application to be activated in the running medium, modifying the current running address in the application registry key of the application to be activated as the base address of the code segment of the application to be activated in the running medium, and fetching an address from the base address of the running medium of the code segment of the application to be activated to execute an activating process;

in response to determining that no current storage address belongs to the address segment, allocating a storage space of the running medium for the code segment of the application to be activated, acquiring a fourth base address of the code segment of the application to be activated, modifying the current running address in the application registry key of the application to be activated to the fourth base address, and fetching an address from the fourth base address on the running medium of the code segment of the application to be activated to execute the activating process;

wherein the fourth base address is a base address of the code segment of the application to be activated on the running medium;

the activating process comprises: acquiring a relative address of a deactivation method in the code segment of the application to be activated, acquiring an absolute address of the deactivation method by adding the current running address in the application registry key of the application to be activated to the relative address of the deactivation method, fetching an address of the deactivation method from the absolute address of the deactivation method to deactivate an application in the active state, acquiring a relative address of the activation method in the code segment of the application to be activated, acquiring an absolute address of the activation method by adding the current running address in the application registry key of the application to be activated to the relative address of the activation method, fetch an address of the activation method from the absolute address of the activation method to activate the application to be activated;

storing the code segment of the application to be activated to a storage space of the RAM, the on-chip FLASH or the off-chip FLASH pointed by the fourth base address.

15. The method of claim 10, further comprising:
receiving an application deactivating instruction of an application to be deactivated, the application deactivating instruction at least comprising identification information of the application to be deactivated;
acquiring an application registry key of the application to be activated based on the identification information of the application to be deactivated;
in the case of acquiring the application registry key of the application to be deactivated, determining whether it is required to delete the intermediate code file of the application to be deactivated according to a type of the application to be deactivated, a requirement on running speed requirement or an application deletion request input by the user;
in response to determining that it is required to delete the intermediate code file, deleting data of the application to be deactivated and the application registry key of the application to be deactivated and deleting the code segment of the application to be deactivated from the RAM, the on-chip FLASH or the off-chip FLASH based on a current storage address in the application registry key of the application to be deactivated;
in response to determining that it is not required to delete the intermediate code file, setting a state of the application to be deactivated to an inactive state with a global variant.

16. The method of claim 10, further comprising:
receiving an application operation instruction;
acquiring an application registry key of the application in an active state;
acquiring a relative address of a method corresponding to the application operation instruction in the code segment of the application in the active state;
acquiring a fifth base address of the code segment of the application in the active state from the application registry key of the application in an active state;
acquiring an absolute address of the method corresponding to the application operation instruction by adding the fifth base address to the relative address of the method corresponding to the application operation instruction;
fetching an address of the method corresponding to the application operation instruction from the absolute address of the method corresponding to the application operation instruction; and
performing the operation corresponding to the application operation instruction;
wherein the fifth base address is a current running address of the code segment of the application in the active state.

17. The method of claim 10, further comprising:
encrypting and decrypting data transmitted between the off-chip FLASH and the on-chip FLASH.

18. The method of claim 10, further comprising:
receiving a class file from an external device.

19. A non-transitory computer readable storage medium; having instructions stored thereon, wherein when the instructions are executed by a processor, the processor is configured to execute a method for loading an application in a smart card, the method comprises;
receiving a downloading instruction of an application to be loaded;
acquiring an intermediate code file of the application to be loaded; the intermediate code file at least comprising: a code segment of the application to be loaded and a first base address of the code segment of the application to be loaded, and the first base address being an address in the on-chip FLASH assigned by the virtual machine for the code segment of the application to be loaded;
generating an application registry key of the application to be loaded; the application registry key comprising at least: identification information of the application to be loaded, a current running address and a current storage address of the code segment of the application to be loaded; and the current running address being the first base address and the current storage address comprising the first base address;

determining whether it is required to move the code segment of the application to be loaded stored in the on-chip FLASH, according to a type of the application to be loaded, a requirement on running speed or a moving request input by the user;

in response to determining that it is required to move the code segment, allocating a storage space of the off-chip FLASH for the code segment of the application to be loaded, acquiring a second base address of the code segment of the application to be loaded, and modifying the current running address as the second base address, wherein the second base address is the base address of the code segment of the application to be loaded in the off-chip FLASH;

storing the code segment of the application to be loaded on the off-chip FLASH.

* * * * *